United States Patent [19]
Geulen

[11] Patent Number: 6,081,711
[45] Date of Patent: Jun. 27, 2000

[54] USSD-POSITIONING

[75] Inventor: Eckhard Geulen, Kerkrade, Netherlands

[73] Assignee: Telefonaktiebolaget LM Ericsson, Stockholm, Sweden

[21] Appl. No.: 08/986,512

[22] Filed: Dec. 8, 1997

[30] Foreign Application Priority Data

Dec. 9, 1996 [DE] Germany ............ 196 51 110

[51] Int. Cl.⁷ .................................................. H04B 7/00
[52] U.S. Cl. ...................... 455/432; 455/433; 455/560
[58] Field of Search ........................... 455/432, 433, 455/435, 434, 458, 422, 560, 561

[56] References Cited

U.S. PATENT DOCUMENTS

| | | |
|---|---|---|
| 5,537,610 | 7/1996 | Mauger et al. . |
| 5,752,188 | 5/1998 | Astrom et al. ............. 455/433 |
| 5,819,180 | 10/1998 | Alperovich ............... 455/435 |

FOREIGN PATENT DOCUMENTS

| | | |
|---|---|---|
| 0 427 687A1 | 5/1991 | European Pat. Off. . |
| 0 715 473A2 | 6/1996 | European Pat. Off. . |
| 2 272 607A | 5/1994 | United Kingdom . |
| 96/20572 | 7/1996 | WIPO . |
| 97/11569 | 3/1997 | WIPO . |

OTHER PUBLICATIONS

Digital cellular telecommunications system; Unstructured Supplementary Service Data (USSD)—Stage 1 (GSM 02.90); GSM Technical Specification; Version 5.1.0; Mar. 1997; pp. 1–11.

Digital cellular telecommunications system; Unstructured Supplementary Service Data (USSD)—Stage 2 (GSM 03.90); GSM Technical Specification; Version 5.0.0; Dec. 1996; pp. 1–35.

Digital cellular telecommunications system; Unstructured Supplementary Service Data (USSD)—Stage 3 (GSM 04.90 version 5.0.1); European Telecommunication Standard; May 1997; pages.

Jacek Biala, Mobilfunk und Intelligente Netze, 1995, pp. 146–151.

*Primary Examiner*—Thanh Cong Le
*Attorney, Agent, or Firm*—Burns, Doane, Swecker & Mathis, L.L.P.

[57] ABSTRACT

A mechanism that guarantees the availability of necessary location data within a mobile communication network and also the transfer thereof to the appropriate network node when needed a mobile station (MS) for use in the digital cellular communication network supporting unstructured supplementary service data comprises service means to perform the standard services between the mobile station (MS) and the digital cellular communication network, interface means to perform the machine interface functionalities at the mobile station (MS), and unstructured supplementary service data means to establish a transaction channel to the digital cellular communication network for the interface transfer of unstructured supplementary service data. In particular, location information indicating means are adapted to identify a cell identifier for a cell within the digital cellular communication network where the mobile station (MS) is roaming and also to output the cell identifier via the unstructured supplementary service data interface means. According to the invention it is possible to use the most exact location information to provide location specific services from the network side in a digital cellular communication network.

13 Claims, 7 Drawing Sheets

USSD-POSITIONING

FIELD OF THE INVENTION

The present invention relates to location dependent services that may be provided without any essential impact on the overall architecture of a digital cellular telecommunication system.

BACKGROUND OF THE INVENTION

Digital cellular telecommunication systems meanwhile are in common use. One example for such a digital cellular telecommunication system is the pan-European mobile telecommunication network GSM for which technical specifications have been elaborated by the European Telecommunication Standards Institute ETSI. Digital cellular telecommunication systems allow its users to initiate and receive calls at any geographical area within the radio coverage of the Home Public Land Mobile Network HPLMN operated by the network operator selected by the subscriber and also within the radio coverage area of partners of the network operator providing services within the Home Public Land Mobile Network HPLMN, i.e. network operators having a roaming agreement with the HPLMN-network operator.

As is shown in FIG. 6, there are usually provided several levels of granularity for the location of information within the pan-European digital cellular telecommunication system. The GSM service area comprises a plurality of N Public Land Mobile Networks PLMN service areas wherein technically the usage of a mobile station is possible. Each Public Land Mobile Network PLMN service area is the domain of a single network operator and is itself divided into a plurality of M Mobile Services Switching Centre MSC service areas. Each Mobile Services Switching Centre MSC service area itself comprises on the average a plurality of K location areas that are constituted by a plurality of cells of which the number is P on the average. It should be noted that the borders of location areas do not necessarily match the borders of the Mobile Services Switching Centre MSC service areas. Also, the location areas represent the geographical areas wherein paging messages are broadcast to all subscribers currently visiting the respective location areas.

Basic sub-systems for the architecture of such a digital cellular telecommunication network system are to establish the services within a PLMN service area, i.e. a Base Station Sub-System BSS, a Network and Switching Sub-System NSS and an Operational Sub-System OSS. The Base Station Sub-System BSS provides and manages transmission paths between Mobile Stations MS and the Network and Switching Sub-System NSS. The Network and Switching Sub-System NSS manages communications and connections to Mobile Stations MS. Neither the Network and Switching Sub-System NSS nor the Base Station Sub-System BSS are in direct contact with external networks, e.g. a Public Switched Telephone Network PSTN, an Integrated Services Digital Network ISDN, or a Packet Switched Public Data Network PSPDN. While the Mobile Station MS, the Base Station Sub-System BSS, and the Network and Switching Sub-System NSS form the operational part of the digital cellular telecommunication network system, the Operational Sub-System OSS provides means for a service provider for their control.

Therefore, in a digital cellular telecommunication network system interaction between sub-systems can be grouped into two main parts, i.e. the operational part via the external networks/GSM service area to the Network and Switching Sub-System NSS, the Base Station Sub-System BSS, the Mobile Station MS to the user and the control part where the service provider directly accesses the Operational Sub-System OSS.

FIG. 7 shows components of the digital cellular telecommunication system being related to the Network and Switching Sub-System NSS and the Base Station Sub-System BSS and the Mobile Station MS, respectively. In particular, FIG. 7 shows a Public Land Mobile Network PLMN that may either be the Home Public Land Mobile Network HPLMN or the Visiting Public Land Mobile Network VPLMN of a subscriber.

To achieve a link between two different PLMN service areas there is provided a Gateway Mobile Service Switching Centre GMSC that serves to determine specific locations of a Mobile Station MS in the digital cellular telecommunication network system and to route calls towards a Mobile Station MS. In addition, an even more important task of the Gateway Mobile Service Switching Centre GMSC is to connect to other networks. For a GSM internal call no Gateway Mobile Service Switching Centre GMSC needs to be invoked.

The Gateway Mobile Service Switching Centre GMSC is connected to a functional unit called Home Location Register HLR wherein two types of information are stored: subscriber information and mobile information to allow incoming calls to be routed to the Mobile Station MS. Any administrative action by the network operator with respect to mobile station data is carried out in the Home Location Register HLR.

To route a call to a Mobile Station MS the Gateway Mobile Service Switching Centre GMSC is also connected to a Mobile Service Switching Centre MSC through which the Mobile Station MS can obtain a service. The Mobile Service Switching Centre MSC performs the necessary switching functions required for Mobile Stations MS covered by this Mobile Service Switching Centre MSC. Also, the Mobile Service Switching Centre MSC monitors the mobility of its Mobile Stations MS and manages necessary resources required to handle and update the location registration procedures.

As outlined above and shown in FIG. 7 the Public Land Mobile Network HPLMN/VPLMN comprises a plurality of Mobile Service Switching Centres MSC and respective service areas each covering a predetermined number of basic cells wherein a Mobile Station MS can move. To this end, each Mobile Service Switching Centre MSC is connected to a Visitor Location Register VLR. The Visitor Location Register VLR is a functional unit that dynamically stores mobile station information, such as the location area in case the mobile station is located in the service area covered by the Visitor Location Register VLR. When a roaming Mobile Station MS enters a service area assigned to a specific Mobile Service Switching Centre MSC the Mobile Service Switching Centre MSC informs the associated Visitor Location Register VLR about the Mobile Station MS.

In addition, the Base Station Sub-System BSS corresponds to physical equipment providing radio coverage to the above-mentioned cells which are approximately hexagonal geographical regions in FIG. 7. Each Base Station Sub-System BSS contains equipment required to communicate with the Mobile Station MS.

In the digital cellular telecommunication network system there are three types of logical channels: traffic channel, control channel, and cell broadcast channel. The traffic channels are used to transmit user information like speech or data. The control channels are used to transmit control and signalling information. Finally, the cell broadcast channels are used to broadcast user information from a Mobile Services Switching Centre MSC to the Mobile Station MS listening in a given basic cell/basic service area.

Using the architecture of the digital cellular telecommunication network system outlined above, there may be provided a group of communication capabilities to the subscribers. The basic telecommunication services provided in the GSM digital cellular telecommunication network system are divided into three main groups: bearer services, teleservices, and supplementary services.

The bearer services give the Mobile Station MS the capacity required to transmit appropriate signals between certain user network interfaces such as data services, alternate speech/data, speech followed by data, clear 3.1 kHz audio service and support of automatic request for retransmission technique for improved error rates.

The teleservices provide the Mobile Station MS with necessary capabilities including terminal equipment functions to communicate with other mobile stations, e.g., short message services, or message handling and storage services.

Finally, supplementary services modify or supplement basic telecommunication services and are provided with or in association with the basic teleservices. Such supplementary services comprise, e.g., number identification services, call offering services, call completion services, multi party services, or call restriction services.

In order to be able to deliver an incoming call to a mobile station on the basis of these different services it is necessary to know the location of the Mobile Station MS at any time. This is achieved through continuous data exchange between the Mobile Station MS and the base station sub-system BSS in the service area where the mobile station is located. Thus, the digital cellular telecommunication network system keeps track of the Mobile Station MS and stores location information in the respective Home Location Register HLR and Visitor Location Register VLR.

However, an important fact in the context of location information in PLMN service areas is that the different granularity levels of location information are not at all stored at any time in any of the different Public Land Mobile Networks PLMN within the overall GSM service area. Any of the Home Location Registers HLR within the Public Land Mobile Network PLMN service areas only knows a subscribers current Mobile Services Switching Centre MSC service area. Neither the location area nor the respective cell ID of any of the mobile stations is available.

Therefore, in case a network operator intends to provide so-called location dependent services he has to rely on one of the following three possibilities:

Firstly, the network operator may broadcast information in a so-called short message service format to all subscribers that currently visit a certain cell within a given mobile services switching centre service area. However, here it is not possible to provide information to a specific mobile station nor is it possible to use location information that is implicitly available but not forwarded to any of the different network nodes HLR/VLR/GMSC.

Secondly, in case the network operator uses information contained in the MSRN of the home location register usually embedded in the numbering plan of the local PTT he may retrieve some location information from these MSRN numbers. However, the information contents with respect to granularity of this information is effectively low and varies to a large extent between the different network providers.

Finally, a network operator might consider the use of location numbers, e.g., of existing proprietary solutions for the provision of operator-specific location dependent services. Here, a network operator may define so-called location numbers in dependence of the used equipment where a location number may cover one to several cells within one or several location areas. The current location number of a mobile station may then be retrieved from the Home Location Register HLR in order to provide location dependent services. Besides the fact that here, too, the granularity of information varies a lot in dependence of the number of location areas covered by a single location number another disadvantage of this approach stems from the non-portability of services provided by different network operators.

Therefore, with respect to the state of the art there arises the problem that within the GSM service area and the different sub-service areas and related network nodes covered thereby, location information with respect to Mobile Stations MS of high significance is not necessarily available at all. However, in case a network operator wants to provide a location dependent service it is necessary to have this information within the network node, e.g. such as a Home Location Register HLR or a Visitor Location Register VLR, where the application executing the services is executed.

In addition, although paging is performed within a whole location area (i.e. a number of cells), the cell identifier can be retrieved from the paging response sent by the Mobile Station (compare ETS GSM 08.08 TS/SMG 030808QR1, MSC-BSS interface Layer 3). This possible solution fails however in case of an established call. In that case the cell identifier is transmitted to the MSC but the information is not updated when handovers take place. Furthermore, using a page request just to retrieve location information might cause interference with the usual behaviour of the mobile station or the user's reception.

Still further, the location information available in the Mobile Station could also be transmitted to the NSS by means of the SM Service. As the related messages pass the Short Message Centre which is outside the borders of GSM no time guarantees can be given for the transmission of short messages and thus the transmission channel cannot be used for a realtime service. Location dependent services as introduced above might however have realtime demands if they for example support the determination of call routing.

SUMMARY OF THE INVENTION

Therefore, the object of the invention is to provide a mechanism that guarantees the availability of necessary location data and the transfer thereof to the appropriate network node when needed.

According to the present invention this object is achieved through a mobile station according to claim 1 and 4, a digital cellular communication network according to claim 7 and 12, and a transfer method according to claim 6.

Thus, according to the present invention it is possible to use the most exact location information to provide location specific services from the network side. Also, it is possible to retrieve the location information in all states of the mobile station, that is out of call, during call, etc.

In addition, a further advantage according to the invention is that it is possible to realize the location specific services without impacting the mobile stations hardware as it is usually intended, e.g., with the use of a global positioning system.

BRIEF DESCRIPTION OF THE FIGURES

In the following detailed embodiments of the present invention will be described with reference to the enclosed drawings in which.

DESCRIPTION OF PREFERRED EMBODIMENTS

According to the present invention use is made of the fact that the mobile station distinguishes between cells by use of the so-called Base Station Identity Code BSIC. This means that the Mobile Station MS always has the most exact information about its own current location within the GSM service area.

It is proposed to use the recently introduced extension to the digital cellular telecommunication network system specification with respect to supplementary services, in particular the exchange of so-called Unstructured Supplementary Service Data USSD, to overcome the problems outlined with respect to the state of the art by transferring the Base Station Identity Code BSIC of a mobile station via communication channels established for the exchange of the Unstructured Supplementary Service Data USSD.

To allow network operators to provide other supplementary services than those defined in the technical specifications, the Unstructured Supplementary Service Data USSD has been specified in ETSI Technical Specification 2.90/prETS 300625, 3.90/prETS 300549, and 4.90/prETS 300572 as dedicated mechanism to exchange information between a Mobile Station MS and a network node application provided in a digital cellular telecommunication network system. Unstructured Supplementary Service Data USSD generally provides a transparent link between a Mobile Station MS and a node application running in either of the Mobile Service Switching Centre MSC, the Visitor Location Register VLR or the Home Location Register HLR.

As outlined above, either of the Mobile Services Switching Centre MSC, the Visitor Location Register VLR or the Home Location Register HLR can at any time set up an USSD-dialogue to a Mobile Station MS. This operation can either be a request for information from the Mobile Station MS or a notification requiring no information from the Mobile Station MS.

Figure 1:
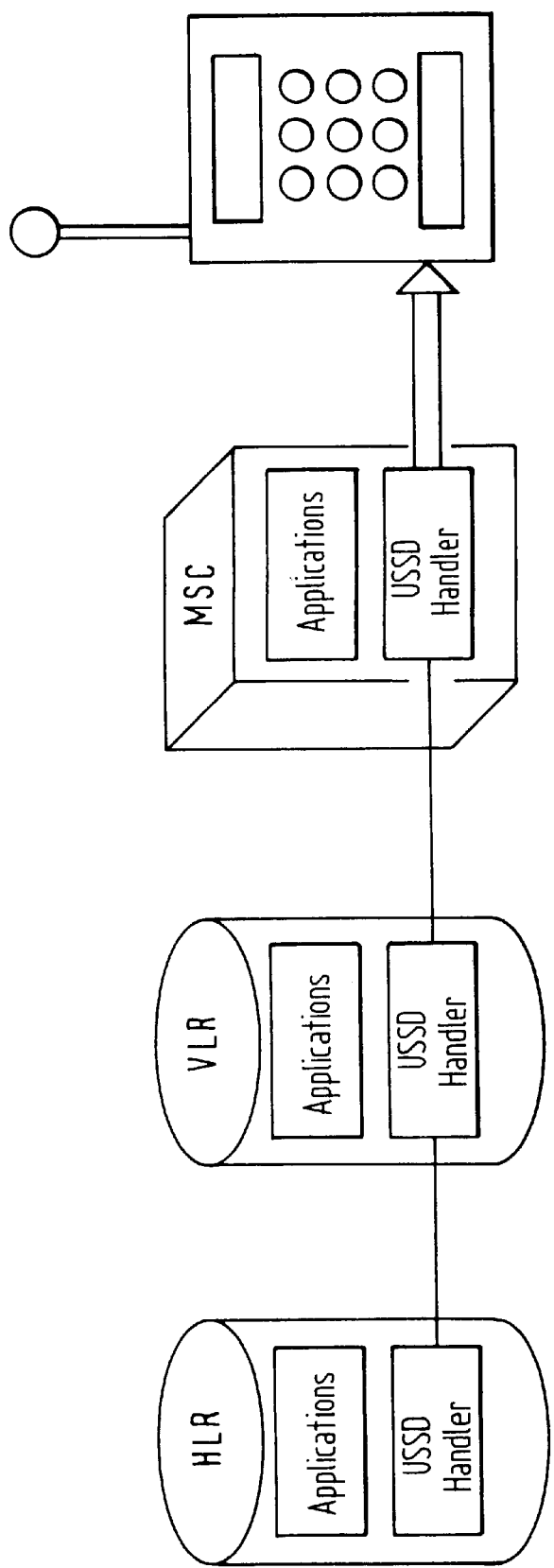
FIG. 1 shows a basic scheme of a transaction channel for unstructured supplementary service data USSD according to the invention.

FIG. 1 shows the handling of network initiated USSD-dialogues in general. When an application in the Home Location Register HLR is to send a USSD-request or notification to a Mobile Station MS it sets up a dialogue to the Visitor Location Register VLR where the Mobile Station MS is currently registered and sends the operation to the Visitor Location Register VLR from where it is relayed to the Mobile Station MS. It then waits on a response. The Home Location Register HLR is responsible for controlling the dialogue and shall therefore release the dialogue when it receives a response from the Visitor Location Register VLR.

Another case relates to an application where the VLR sends a USSD-request or notification to a Mobile Station MS and sets up a dialogue to the Mobile Services Switching Centre MSC where the Mobile Station MS is currently registered. Here, the Visitor Location Register VLR sends the operation to the Mobile Services Switching Centre MSC and then awaits a response. The Visitor Location Register VLR is responsible for controlling the application and therefore normally releases the application when it receives a response from the Mobile Services Switching Centre MSC. As in the above-mentioned case, also with a dialogue invoked by the Visitor Location Register VLR the dialogue is forwarded by the Mobile Services Switching Centre MSC.

The third case relates to an application where a Mobile Services Switching Centre MSC sends a USSD-request or notification to a Mobile Station MS. If the Mobile Station MS releases the transaction at any time, e.g., due to a clearing, the Mobile Services Switching Centre MSC terminates the USSD-dialogue.

Thus, unstructured supplementary data operations can be initiated either by the Mobile Station MS or from the network side.

Figure 2:
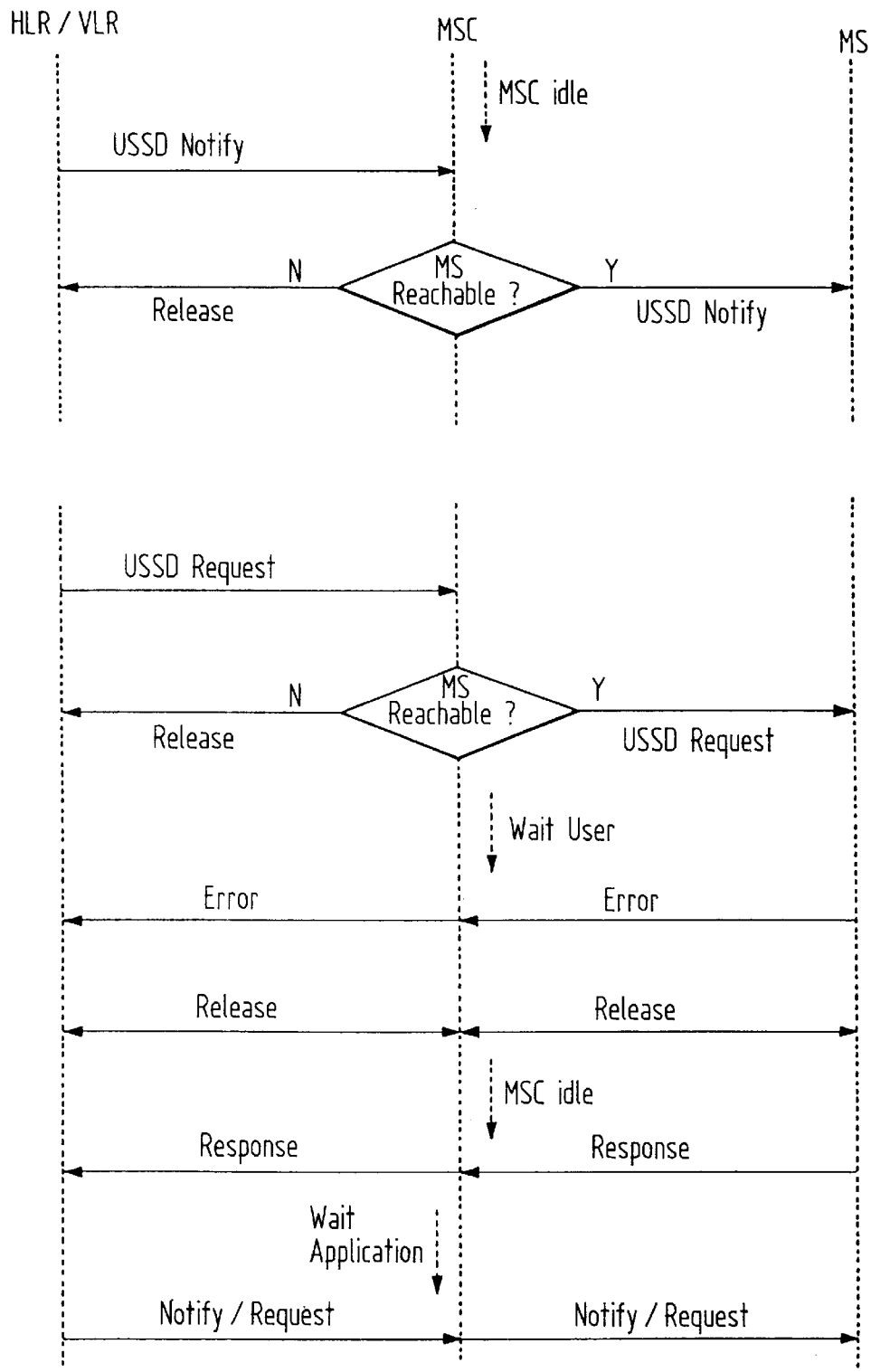
FIG. 2 shows a typical flowchart for the transfer of unstructured supplementary service data USSD according to the invention.

FIG. 2 shows a node application in which a USSD-dialogue is either running on a Home Location Register HLR or a Visitor Location Register VLR and requires a USSD-notification or USSD-request. With a USSD-notification the Mobile Services Switching Centre MSC checks on whether the mobile station is reachable or not and then either transfers the USSD-notification to the mobile station or releases the USSD-dialogue with the Home Location Register HLR or the Visitor Location Register VLR.

These steps are also carried out for a USSD-request. However, this situation is a little bit more complicated in that the user of the mobile station has to provide a response for the node application initiating the USSD-request. In case this is not possible an error message will be transferred to this node application.

Also, a release can be initiated either by the node application or the mobile station to interrupt the USSD-dialogue. In case the user of the mobile station provides the required response after some time the node application may initiate further USSD-notification or -requests in reply thereto.

Every USSD-dialogue requires the provision of a transaction channel between the Mobile Services Switching Centre MSC and the Mobile Station MS. This transaction channel may be provided for independent of specific hardware features in the digital cellular telecommunication system and is based on the high level transfer protocols defined for such systems. Further, in the following it will be assumed that the full capacity of such a virtual transaction channel may be divided into subunits referred to as transaction frames.

According to the present invention it is proposed to use a USSD-dialogue for transferring a request and for actually transmitting a location information of a mobile station. The use of this method allows the retrieval of location information for a mobile station in any operating state of the mobile station, e.g. out of call, during call, etc.

Figure 3:
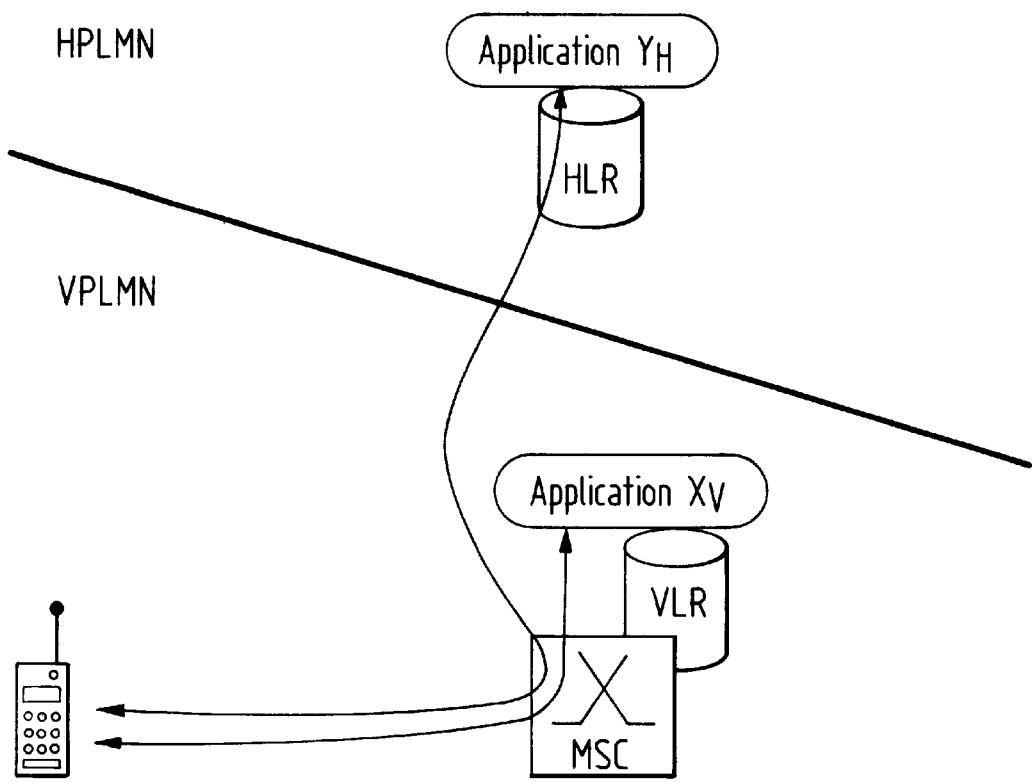
FIG. 3 shows a basic scheme for possible localizations of location specific services from the network side.

As shown in FIG. 3 within the present invention there are distinguished two cases. The location dependent service is either executed in the Home Public Land Mobile Network HPLMN or in the Visited Public Land Mobile Network VPLMN. In both cases the USSD-dialogue mechanism serves to establish USSD-dialogues from and to the respective network node, i.e. from the home location register HLR and the visitor location register VLR to the respective service area of the mobile station.

This virtual USSD-transaction channel may then be used for the transfer of location information for a specific mobile station serving as a basis for location dependent services of the network operator.

In particular, according to the first embodiment of the invention there is considered the transfer of location information on request. This means that the location dependent service application running in the Home Public Land Mobile Network HPLMN or the Visited Public Land Mobile Network VPLMN sends a USSD-request for the transfer of location information, if necessary.

Figure 4:
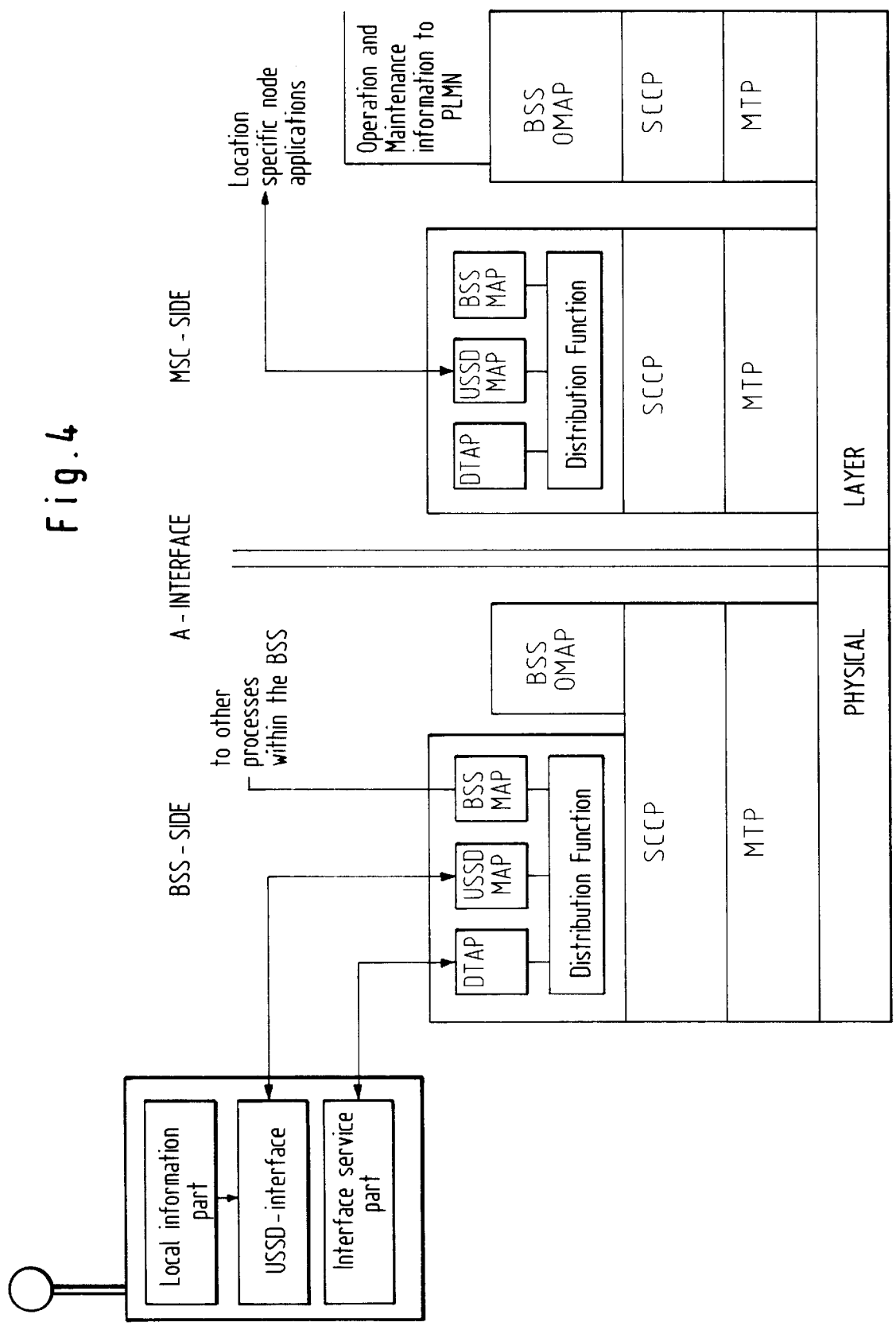
FIG. 4 shows a transport mechanism underlying the different embodiments of the invention.
Figure 5:
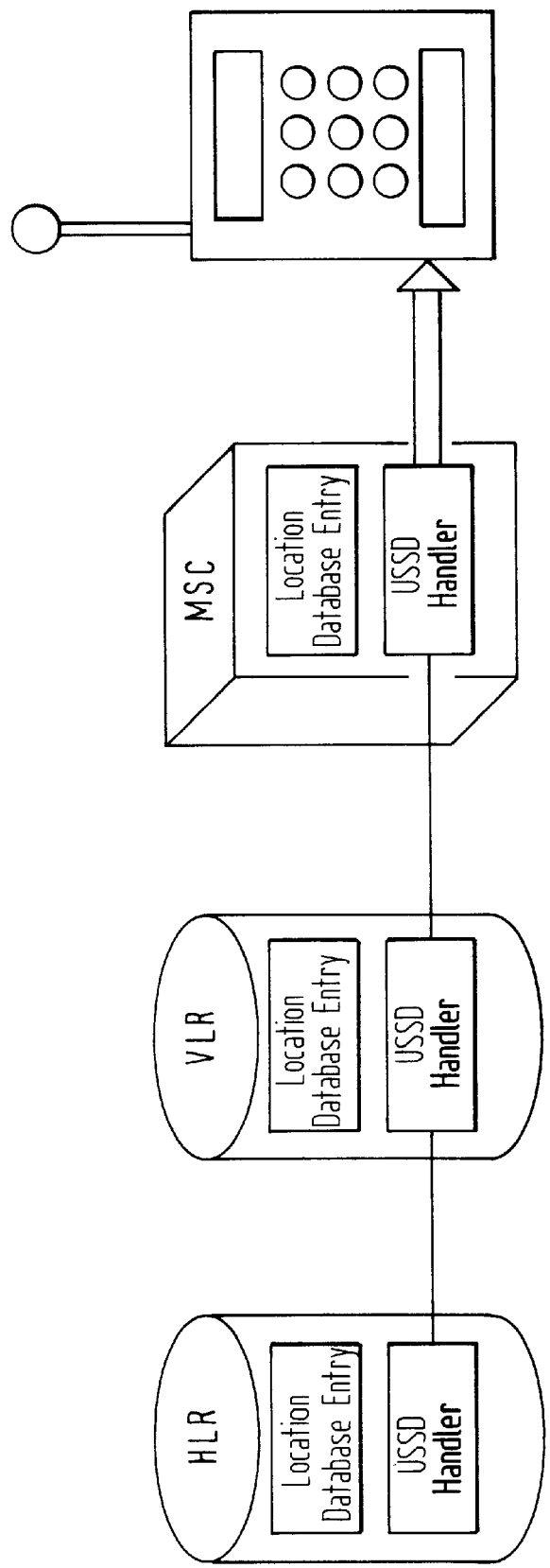
FIG. 5 shows the handling of location information according to the second embodiment of the invention.
Figure 6:
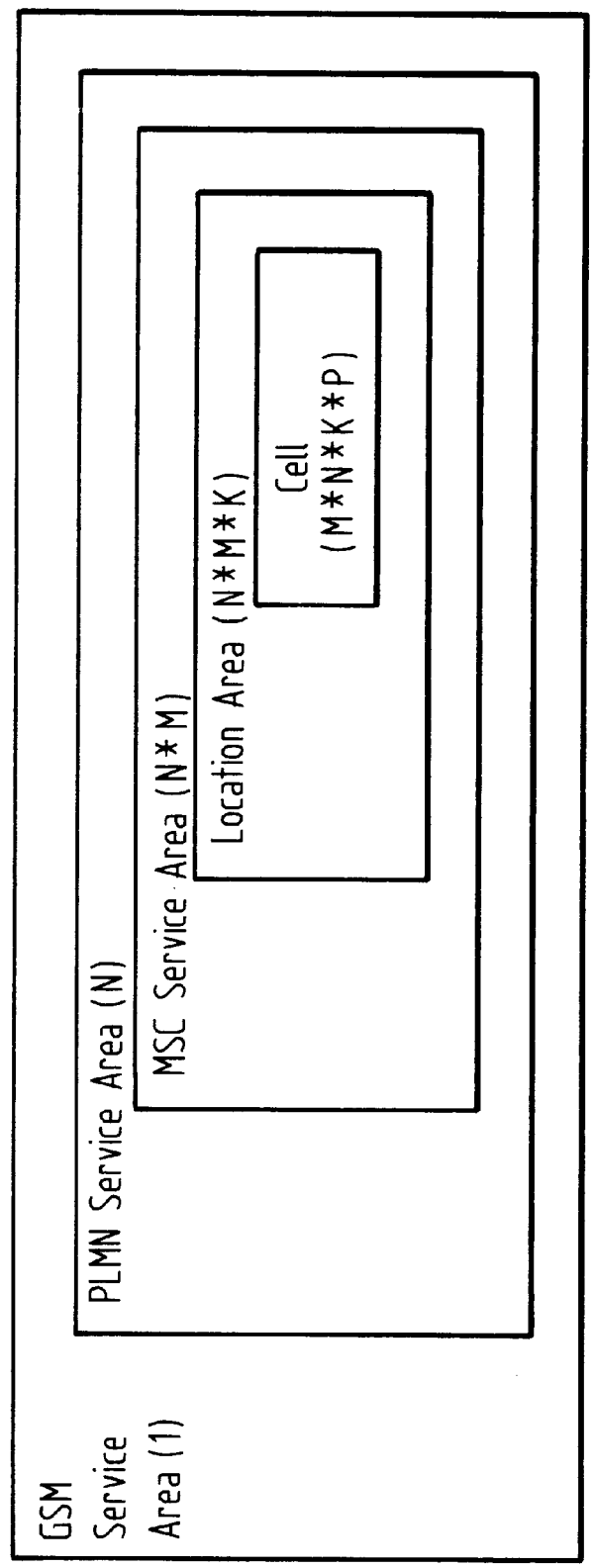
FIG. 6 shows the different levels of hierarchy within a digital cellular communication network.
Figure 7:
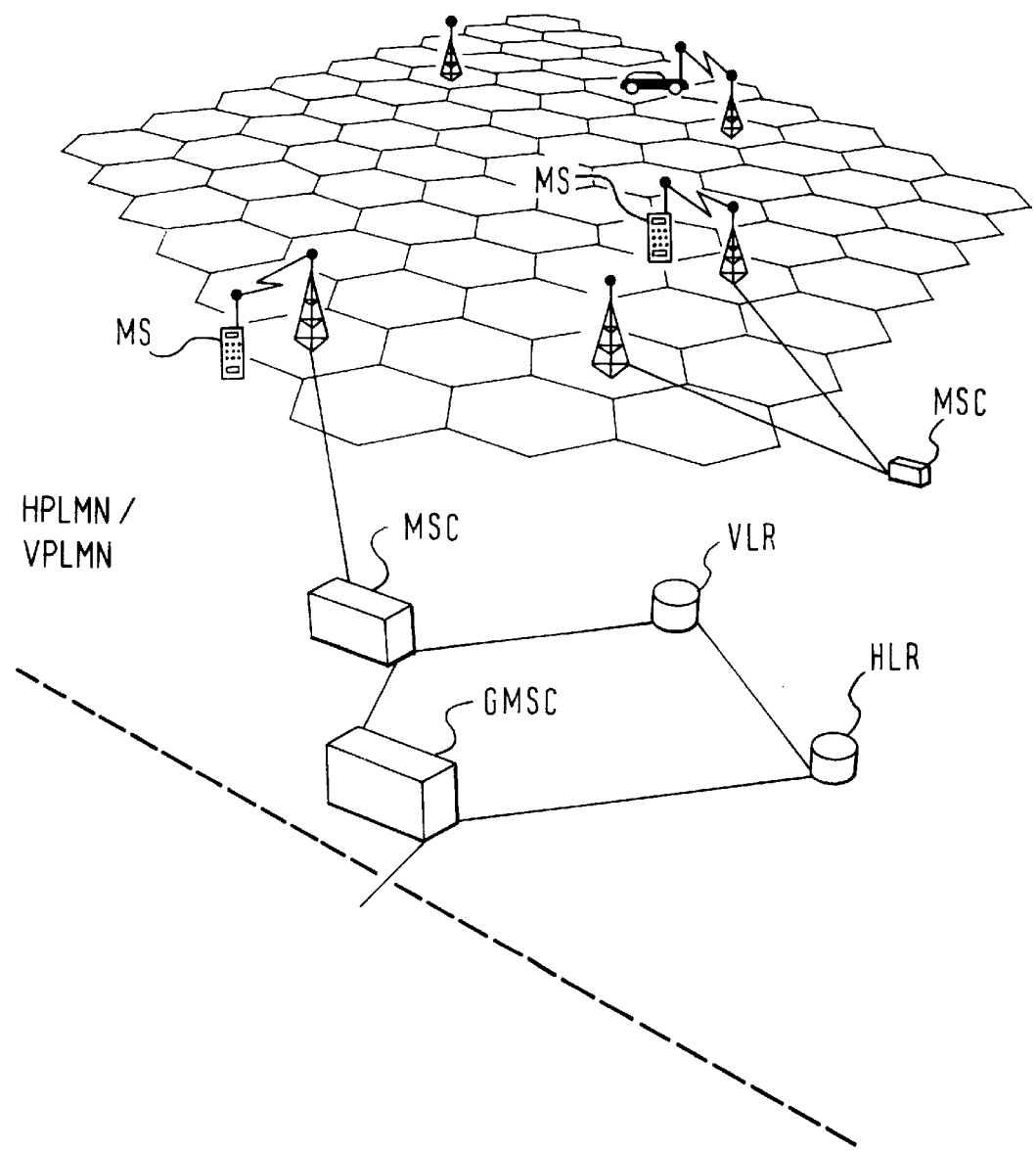
FIG. 7 shows basic components for the implementation of a digital cellular communication network.

The transport mechanism underlying this embodiment and defined to carry information between the Mobile Station MS, the Basic Sub-System BSS and the Mobile Switching Centre MSC and then further to the visited and home public land mobile network, respectively, is shown in FIG. 4.

In particular, besides the usual physical transport layer, on each side of an A-interface there is provided a Message Transfer Part MTP and a Signalling Connection Control Part SCCP. The Message Transfer Part MTP and the Signalling Connection Control Part SCCP are used to support communication to the Mobile Station MS and further contain additional conceptual entities such as the BSS Operation and Maintenance Application Part BSS OMAP and the BSS Application Part BSS MAP of which the first allows to transfer operation and maintenance messages and the second supports all procedures that require interpretation and processing of information related to single calls and resource management.

In addition, a Direct Transfer Application Part DTAP is used to transfer call control and mobility management messages between the Mobile Services Switching Centre MSC and the Mobile Station MS.

Further, an Unstructured Supplementary Service Data Management Application Part USSD-MAP is provided for the transfer of the unstructured supplementary service data mentioned above and used for the transfer of information indicating the local position of the mobile station. These parts serve to implement the different USSD-notification and request processes outlined above with respect to FIGS. 1 and 2.

As shown in FIG. 4 according to the first embodiment the Mobile Station MS contains an interface and service part to implement the bearer services, the teleservices and the supplementary services mentioned above. These services are established via the Direct Transfer Application Part DTAP for the transfer of call control and mobility management messages.

In order to decode USSD-requests, e.g., for location information there is provided an USSD-interface part that can be implemented as additional circuit in the mobile station. Another option for the realization of the USSD-interface part is the provision of an additional software routine in the interface service part. This leads to the additional advantage that the location specific services have no impact on the hardware of the mobile station.

A local information part that continuously stores the Base Station Identity Code BSIC serves to provide location information for the implementation of location dependent services outlined above. This local information part activates the USSD-interface part to transfer the Base Station Identity Code BSIC via the USSD-management application parts on the BSS- and MSC-side to location specific applications of the network operator.

It is important to note that this approach allows the retrieval of location information in all states of the Mobile Station MS, e.g., out of calling, during calling and so on.

Further, according to the second embodiment location information is transferred via the virtual USSD-transaction channel whenever the Mobile Station MS detects a change of the valid Base Station Identity Code BSIC. This embodiment requires an additional database entry, e.g., in both the Visitors Location Register VLR within the Visited Public Land Mobile Network VPLMN serving the Mobile Station Switching Centre MSC of the mobile station and the Home Location Register HLR of the Home Public Land Mobile Network HPLMN where the current location information may be stored and referred to by location dependent applications when needed.

The second embodiment of the invention requires an additional circuit or routine within the local information part of the Mobile Station MS that is able to set up a mobile initiated USSD-dialogue for the transfer of the modified Base Station Identity Code BSIC to either the Visitor Location Register VLR or the Home Location Register HLR.

Further, according to the second invention it is possible to provide the location specific services through the network operator in conjunction with additional subscriber data available on the MSC-side. For example the location information may be combined with further subscription information as the RSZI, MSC-flag or service restriction data so as to provide location specific services in a selective manner. These possibilities are summarized in the following table 1.

| | Subscriber data | |
|---|---|---|
| | Permanent Subscriber Data | Temporary Subscriber data |
| | Roaming Related Data | |
| MSRN | | Mobile Station Roaming Number; VLR |
| Subscription Information | Restriction of area accessible for Mobile Station; HLR | |
| RSZI | Regional Subscription Information; HLR, VLR | |
| MSC-Flag | | MSC area restricted flag; HLR |
| Service Restriction Data | | Roaming restriction due to unsupported feature; HLR, VLR |
| | Mobile Station Status Data | |
| Roaming PLMN | Barring of Roaming Operator determined barring of supplementary services; HLR, VLR | |

Thus, it is possible to achieve even greater flexibility and provide location specific services in the most flexible way.

What is claimed is:

1. A mobile station for use in a digital cellular communication network supporting unstructured supplementary service data, said mobile station comprising:
   a) service means to perform the standard services between the mobile station (MS) and the digital cellular communication network,
   b) interface means to perform the man-machine interface functionalities at the mobile station (MS),
   c) unstructured supplemental service data means to establish a transaction channel to the digital cellular communication network for the interface transfer of unstructured supplementary service data thereover, d) location information indicating means adapted to identify a cell identifier for a cell within the digital cellular communication network where the mobile station (MS) is roaming and to output the cell identifier via the unstructured supplementary service data interface means; wherein e) the local information indicating means activates the unstructured supplementary service data interface means upon receipt and decoding of a request from the digital cellular communication network.

2. The mobile station for a digital cellular communication network according to claim 1, wherein the local information indicating means is adapted to identify a base station identity code (BSIC) within the digital cellular communication network.

3. A mobile station for use in a digital cellular communication network supporting unstructured supplementary service data, said mobile station comprising:

a) service means to perform the standard services between the mobile station (MS) and the digital cellular communication network, b) interfaces means to perform the man-machine interface functionalities at the mobile station (MS), c) unstructured supplementary service data means to establish a transaction channel to the digital cellular communication network for the interface transfer of unstructured supplementary service data thereover, d) location information indicating means adapted to identify a cell identifier for a cell within the digital cellular communication network where the mobile station (MS) is roaming, to output the cell identifier via the unstructured supplementary service data interface means, and to identify a base station identity code (BSIC) within the digital cellular communication network; wherein e) the local information indicating means activates the unstructured supplementary service data interface means upon receipt and decoding of a request from the digital cellular communication network.

4. The mobile station for a digital cellular communication network according to claim 3, wherein the mobile station further comprises a base station identity code detection means to detect a change of the valid base station identity code (BSIC) during roaming of the mobile station (MS) within the digital cellular communication network and that the local information indicating means is adapted to output an updated station identity code (BSIC) detected by the base station detection means.

5. A digital cellular communication network with at least one public land mobile network, comprising:

a) at least one mobile services switching center (MSC) adapted to transfer unstructured supplementary data to at least one base station sub-system in the digital cellular communication network, b) at least one home location register (HLR) adapted to store permanent subscriber data and output this permanent subscriber data to the mobile services switching center, c) at least one visitor location register (VLR) adapted to store and update temporary subscriber data and output temporary subscriber data to the mobile services switching center, d) at least one base station sub-system (BSS) linked to the mobile services switching center and adapted to transfer unstructured supplementary service data to at least one mobile station roaming in the digital cellular communication network, wherein e) the visitor location register is provided with a first cell identifier storage means adapted to store a cell identifier for a mobile station roaming in the digital cellular communication network that is transferred via the base station sub-system.

6. The digital cellular communication network according to claim 5, wherein in addition the home location register is provided with a second cell identifier storage means to store the cell identifier of the mobile station.

7. The digital cellular communication network according to claim 5, wherein the cell identifier stored in the first cell identifier storage means or the second cell identifier storage means is adapted on request of an application running in a network node of the digital cellular communication network.

8. The digital cellular communication network according to claim 5, wherein the cell identifier stored in the first cell identifier storage means or the second cell identifier storage means is automatically updated each time the cell identifier changes due to roaming of the mobile station.

9. The digital cellular communication network according to claim 5, wherein the cell identifier is implemented as base station identity code in a digital cellular communication network.

10. A digital cellular communication network with at least one public land mobile network, comprising:

a) at least one mobile services switching center (MSC) adapted to transfer unstructured supplementary data to at least one base station sub-system in the digital cellular communication network, b) at least one home location register (HLR) adapted to store permanent subscriber data and output this permanent subscriber data to the mobile services switching center, the home location register being provided with a second cell identifier storage means to store the cell identifier of the mobile station, c) at least one visitor location register (VLR) adapted to store and update temporary subscriber data and output temporary subscriber data to the mobile services switching center, d) at least one base station sub-system (BSS) linked to the mobile services switching center and adapted to transfer unstructured supplementary service data to at least one mobile station roaming in the digital cellular communication network, wherein e) the visitor location register is provided with a first cell identifier storage means adapted to store a cell identifier for a mobile station roaming in the digital cellular communication network that is transferred via the base station sub-system, and f) the cell identifier stored in the first cell identifier storage means or the second cell identifier storage means is adapted on request of an application running in a network node of the digital cellular communication network or automatically each time the cell identifier changes due to roaming of the mobile station, respectively.

11. The digital cellular communication network according to claim 10, wherein the visitor location register is provided with a linking means to combine the contents of the first cell identifier storage means with further storage means subscriber data so as to be stored in the visitor location register.

12. The digital cellular communication network according to claim 11, wherein the linking means combines the contents of the first cell identifier storage means with roaming related to subscriber data stored in the home location register.

13. The digital cellular communication network according to claim 11, wherein the linking means combines the contents of the first cell identifier storage means with roaming related data stored in the visitor location register.

* * * * *